(12) United States Patent
Paze'

(10) Patent No.: US 8,397,863 B2
(45) Date of Patent: Mar. 19, 2013

(54) MUFFLER WITH A BUILT-IN HEAT EXCHANGER

(75) Inventor: Costanza Paze', Chivasso (IT)

(73) Assignee: Magneti Marelli S.p.A. (IT)

( * ) Notice: Subject to any disclaimer, the term of this patent is extended or adjusted under 35 U.S.C. 154(b) by 0 days.

(21) Appl. No.: 13/191,659

(22) Filed: Jul. 27, 2011

(65) Prior Publication Data

US 2012/0024507 A1   Feb. 2, 2012

(30) Foreign Application Priority Data

Jul. 27, 2010   (IT) .............................. BO2010A0474

(51) Int. Cl.
*F01N 1/00* (2006.01)
(52) U.S. Cl. ........ 181/254; 181/237; 181/252; 181/238; 181/222; 181/258; 165/138
(58) Field of Classification Search .................. 181/252, 181/238, 222, 258, 254, 237; 165/138
See application file for complete search history.

(56) References Cited

U.S. PATENT DOCUMENTS

| | | | | |
|---|---|---|---|---|
| 2,984,315 | A * | 5/1961 | Kleinecke ........................ | 96/145 |
| 4,079,810 | A * | 3/1978 | Prather et al. .................. | 181/266 |
| 4,252,212 | A * | 2/1981 | Meier ............................ | 181/248 |
| 5,101,930 | A * | 4/1992 | Fargo et al. .................... | 181/233 |
| 6,250,380 | B1 * | 6/2001 | Strahle et al. .................. | 165/167 |
| 6,598,390 | B2 * | 7/2003 | Chang ............................. | 60/323 |
| 6,644,437 | B1 * | 11/2003 | Hayman ........................ | 181/268 |
| 7,527,126 | B2 * | 5/2009 | Kuroda et al. ................. | 181/254 |
| 7,610,993 | B2 * | 11/2009 | Sullivan ........................ | 181/268 |
| 2006/0054381 | A1 * | 3/2006 | Takemoto et al. ............. | 181/237 |

FOREIGN PATENT DOCUMENTS

| | | |
|---|---|---|
| EP | 1 443 186 A1 | 8/2004 |
| FR | 2 859 238 A1 | 3/2005 |
| FR | 2 905 978 A1 | 3/2008 |
| JP | 2004-245127 A | 9/2004 |
| JP | 2007-32561 A | 2/2007 |
| WO | 2005/024193 A1 | 3/2005 |
| WO | 2008/117580 A1 | 2/2008 |

OTHER PUBLICATIONS

Feb. 23, 2011 Search Report for Italian Patent App. No. B02010A 000474.

* cited by examiner

*Primary Examiner* — Forrest M Phillips
(74) *Attorney, Agent, or Firm* — Bliss McGlynn, P.C.

(57) ABSTRACT

A muffler having an inlet and an outlet, through which exhaust gas flows; a tubular main body; a heat exchanger inside the main body; a noise-deadening first conduit, which extends at least partly inside the main body, from a fork region located directly downstream from the inlet, to a converging region directly upstream from the outlet; a second conduit, which extends through the heat exchanger and at least partly inside the main body, from the fork region to the converging region and parallel to the first conduit; and a regulating valve located outside the main body, to selectively direct exhaust gas flow along the first conduit or the second conduit.

16 Claims, 6 Drawing Sheets

MUFFLER WITH A BUILT-IN HEAT EXCHANGER

BACKGROUND OF THE INVENTION

1. Field of the Invention

The present invention relates to a muffler with a built-in heat exchanger.

2. Description of the Related Art

Internal combustion engines are equipped with an exhaust system for discharging spent gas into the atmosphere, while at the same time reducing noise and the contaminating substances in the gas. Modern exhaust systems include at least a catalytic converter followed by at least a muffler in which a labyrinth is formed defining a path along which the exhaust gas flows from the inlet to the outlet.

To improve overall energy efficiency, it has recently been proposed to also make use of part of the heat in the exhaust system, which is normally dispersed into the atmosphere, for purposes such as heating the engine cooling fluid when starting the engine, to reach running temperature faster. One proposed solution is to employ a liquid-gas heat exchanger installed along the path of the exhaust gas so the exhaust gas flows through it. To selectively feed the exhaust gas through the heat exchanger in specific conditions only (e.g. when the engine is cold, and the heat in the exhaust gas is used to heat the engine cooling fluid faster), it has been proposed to employ a bypass conduit controlled by a bypass valve and enabling the exhaust gas to bypass the heat exchanger. One example of an exhaust system heat exchanger of this type is described in Patent Application WO2005024193A1.

To reduce cost and size, it has been proposed to build the heat exchanger into the muffler, as described in Patent Applications JP2004245127A1 and WO2008117580A1. These known solutions, however, have several drawbacks, foremost of which is the complex design of the bypass valve, in which the shutter is integral with a very long shaft that has to come out of the main body of the muffler through a gastight hole; and, because of its length, the shaft is subject to severe thermal expansion by the hot (at least 250-300° C.) exhaust gas flowing through the muffler. Moreover, when the bypass valve in these known solutions is open (which is most of the time), the noise-deadening efficiency of the muffler is poor compared with a similar standard muffler with no heat exchanger. Both these known solutions are complicated and expensive to produce.

Patent Application JP2007032561A1 describes a muffler with a built-in heat exchanger, in which a valve directs the exhaust gas selectively along a heat exchange path or along a bypass path parallel to the heat exchange path; and thermal insulation is provided between the bypass path and heat exchange path to reduce heat exchange between the two.

SUMMARY OF THE INVENTION

It is an object of the present invention to provide a muffler with a built-in heat exchanger, designed to eliminate the above drawbacks, and which in particular is inexpensive and easy to produce.

Accordingly, the present invention is directed toward a muffler having an inlet and an outlet through which exhaust gas flows. The muffler includes a tubular main body, a heat exchanger disposed within the main body, and a noise-deadening first conduit that extends at least partially inside the main body from a fork region located directly downstream from the inlet to a converging region directly upstream from the inlet. In addition, the muffler also includes a second conduit that extends through the heat exchanger and at least partly inside the main body from the fork region to the converging region and parallel to the first conduit. A regulating valve is located outside the main body to selectively direct exhaust gas flow along the first conduit or the second conduit.

BRIEF DESCRIPTION OF THE DRAWINGS

A number of non-limiting embodiments of the present invention will be described by way of example with reference to the accompanying drawings, in which.

DETAILED DESCRIPTION OF THE PREFERRED EMBODIMENT(S)

Figure 1:
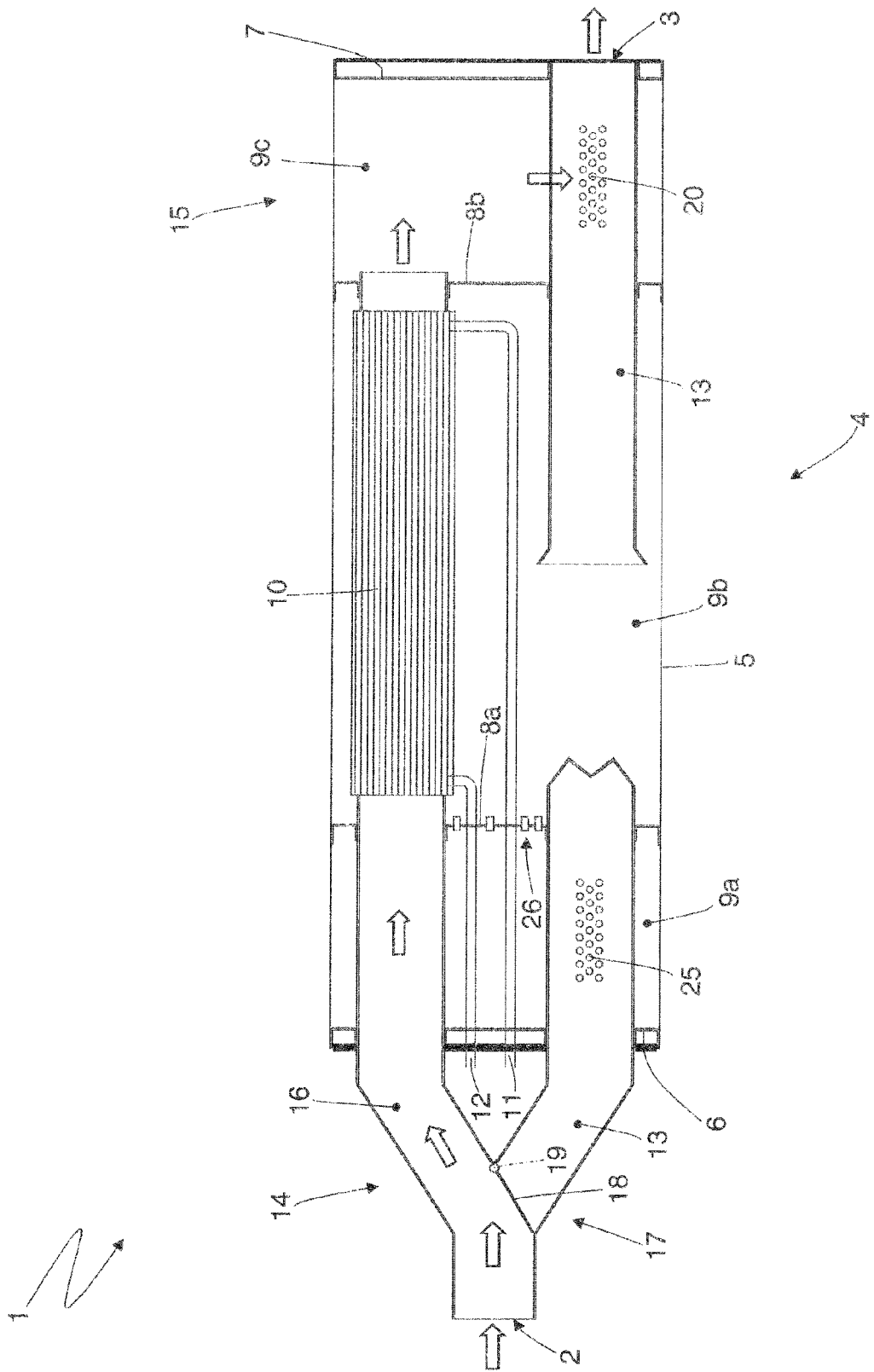
FIG. 1 shows a schematic longitudinal section of a muffler with a built-in heat exchanger in accordance with the present invention.

The muffler of the present invention is generally indicated at 1 in FIG. 1. The muffler has an inlet 2 and an outlet 3, through which exhaust gas flows through muffler 1. The muffler 1 has a tubular main body 4 made of sheet metal with a preferably oval cross section. Main body 4 comprises a cylindrical (single- or two-sheet metal) lateral wall 5; a flat front wall 6, close to inlet 2, and a flat rear wall 7, close to outlet 3, which close both ends of cylindrical lateral wall 5.

Main body 4 houses one or more diaphragms 8 parallel to walls 6 and 7 and dividing the inside of main body 4 into a number of side by side chambers 9a, 9b, 9c; and a liquid-gas heat exchanger 10 for recovering part of the heat in the exhaust gas flowing through muffler 1. In one embodiment, heat exchanger 10 comprises a liquid inflow conduit 11 and a liquid outflow conduit 12, which exit main body 4 longitudinally through front wall 6 (i.e. perpendicular to front wall 6 and parallel to the body of heat exchanger 10) or through rear wall 7 (i.e. perpendicular to rear wall 7 and parallel to the body of heat exchanger 10). This arrangement of conduits 11 and 12 minimizes the structural stress caused by the different operating temperature and thermal expansion of heat exchanger 10 with respect to the other parts of muffler 1 because heat exchanger 10 is always much colder than the rest of muffler 1, by being cooled continually by the liquid flowing inside it.

Muffler 1 comprises a noise-deadening conduit 13, which extends partly inside main body 4 from a fork region 14 directly downstream from inlet 2, to a converging region 15 directly upstream from outlet 3; and a conduit 16, which extends, parallel to conduit 13, through heat exchanger 10 and partly inside main body 4 from fork region 14 to converging region 15. In one embodiment, conduits 13 and 16 are functionally parallel, and physically positioned side by side. Muffler 1 also comprises a regulating valve 17 for selectively directing the exhaust gas along conduit 13, as shown in FIGS. 2 and 4, or along conduit 16, as shown in FIGS. 1 and 3.

Figure 2:
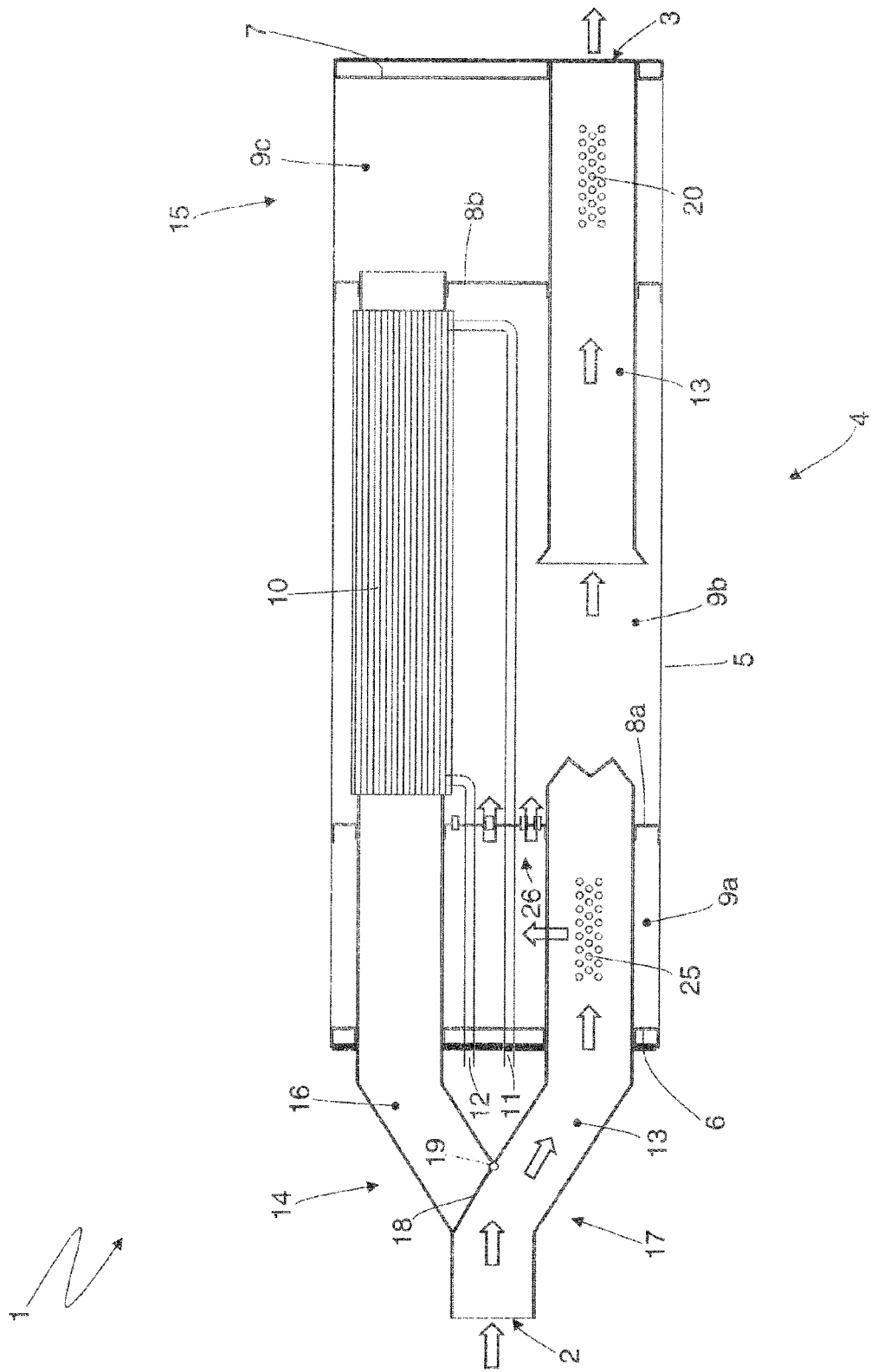
FIG. 2 shows a schematic longitudinal section of the muffler illustrated in FIG. 1 with a regulating valve in a different open position.
Figure 3:
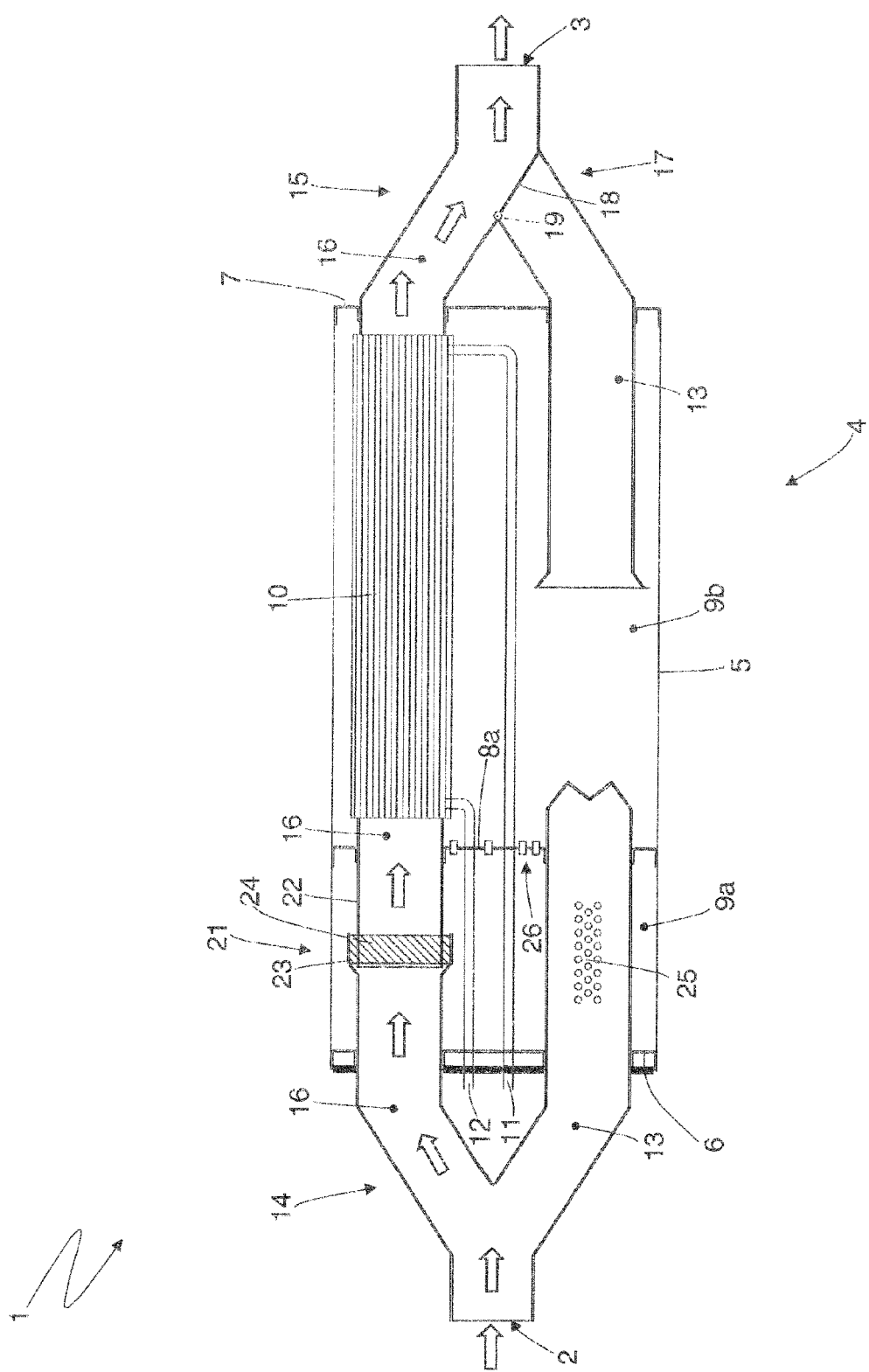
FIG. 3 shows a schematic longitudinal section of another embodiment of a muffler with a built-in heat exchanger in accordance with the present invention.
Figure 4:
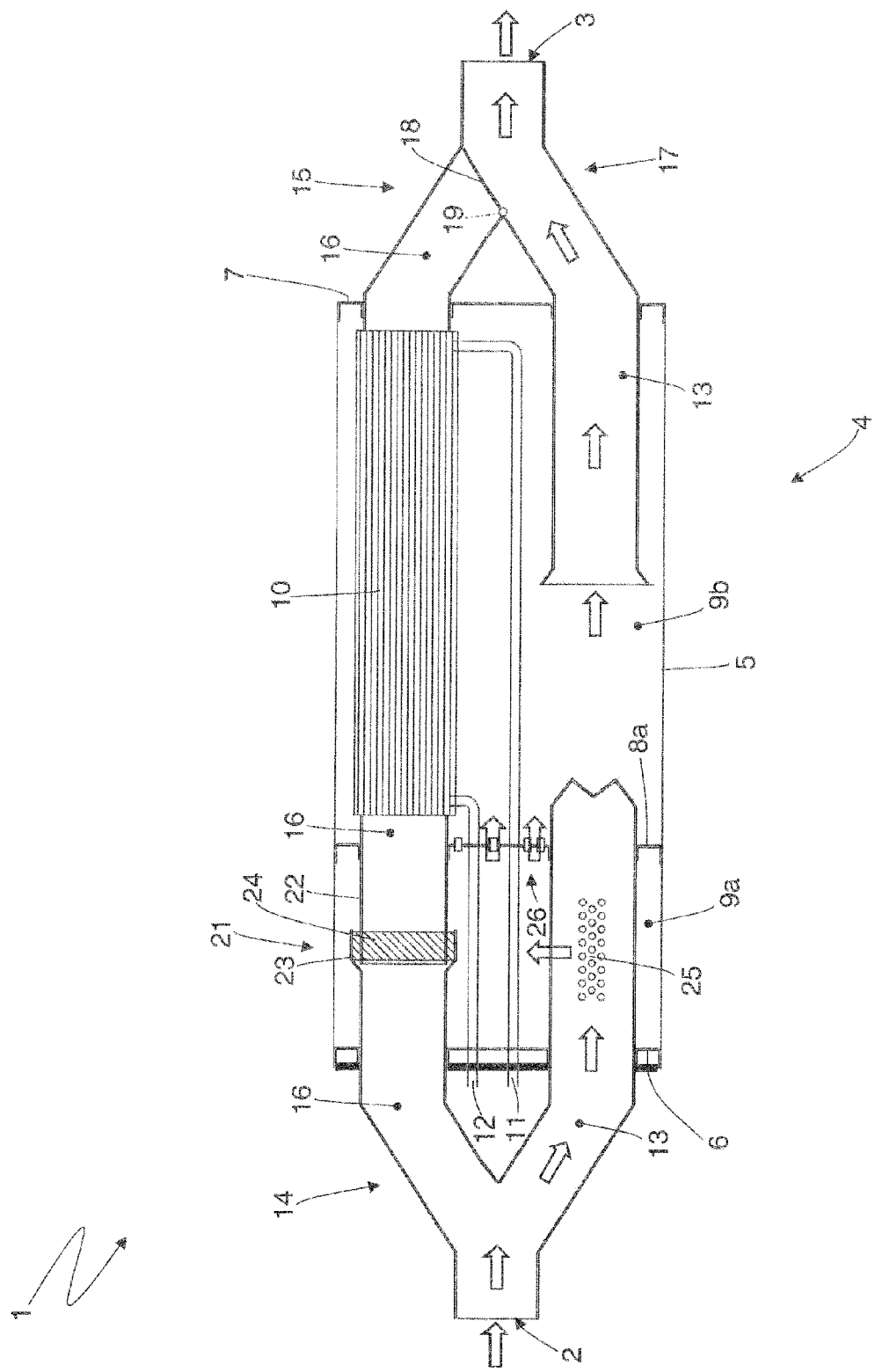
FIG. 4 shows a schematic longitudinal section of the muffler illustrated in FIG. 3 with a bypass valve in a different open position.

Regulating valve 17 comprises a flat shutter 18 hinged to rotate, about an axis of rotation 19, between a first position closing conduit 13, as shown in FIGS. 1 and 3, and a second position closing conduit 16, as shown in FIGS. 2 and 4. Regulating valve 17 is located outside main body 4, either at fork region 14 directly downstream from inlet 2, as shown in the FIGS. 1 and 2 embodiment, or at converging region 15 directly upstream from outlet 3 as in the FIGS. 3 and 4 embodiment. Accordingly, the regulation valve 17 can be much more compact, by enabling the, for example, pneumatic valve actuator (not shown) to be located close to shutter 18, thus greatly reducing the length and thermal expansion of the actuator-operated shaft supporting shutter 18.

In the embodiment illustrated in FIGS. 1 and 2, fork region 14 is located outside main body 4, and, as noted above, regulating valve 17 is located at fork region 14 directly downstream from inlet 2. At fork region 14, conduits 13 and 16 slope to form a 'V' shape. Shutter 18 of regulating valve 17 is hinged at the vertex of the 'V' to rotate about axis of rotation 19 between the first position closing conduit 13, as shown in FIG. 1, and the second position closing conduit 16, as shown in FIG. 2.

In the embodiment illustrated in FIGS. 1 and 2, converging region 15 is located inside main body 4, and is defined by an end chamber 9c formed inside main body 4, close to rear wall 7, and in which conduit 16 terminates. Conduit 13 extends through, and has a number of through holes 20 inside, end chamber 9c. The exhaust gas flowing into end chamber 9c from conduit 16 flows through holes 20 into the end portion of conduit 13 and out through outlet 3.

In the embodiment illustrated in FIGS. 1 and 2, conduit 16 extends along main body 4 through front wall 6 but not through rear wall 7. Conduit 13 extends along main body 4 through both front wall 6 and rear wall 7. Only inlet 2 is located outside main body 4, at a distance from front wall 6 and outlet 3 is located at rear wall 7.

In the embodiments illustrated in FIGS. 3 and 4, converging region 15 is also located outside main body 4, and, as noted above, regulating valve 17 is located at converging region 15 directly upstream from outlet 3. At converging region 15, conduits 13 and 16 slope to form a 'V' shape. Shutter 18 of regulating valve 17 is hinged at the vertex of the 'V' to rotate about axis of rotation 19 between the first position closing conduit 13, as shown in FIG. 3, and the second position closing conduit 16, as shown in FIG. 4. Fork region 14 is also located outside main body 4. At fork region 14, conduits 13 and 16 slope to form a 'V' as in the embodiments illustrated in FIGS. 1 and 2.

In the embodiment illustrated in FIGS. 3 and 4, conduits 13 and 16 extend through main body 4, through both front wall 6 and rear wall 7. Inlet 2 and outlet 3 are both located outside main body 4, at a distance from front wall 6 and rear wall 7 respectively.

In the embodiment illustrated in FIGS. 3 and 4, conduit 16 extends through main body 4, through both front wall 6 and rear wall 7, but is interrupted by a compensating portion 21 for minimizing the structural stress caused by the different operating temperatures and thermal expansions of the part of conduit 16 extending through heat exchanger 10. Thus, the rest of muffler 1 (heat exchanger 10, and therefore the part of conduit 16 extending through it) are always much colder than the rest of muffler 1, on account of the heat exchanger being cooled continually by the liquid flowing inside it. In the embodiment shown in FIGS. 3 and 4, at compensating portion 21, a smaller-diameter portion 22 of conduit 16 fits inside, and is slidable longitudinally with respect to, a larger-diameter portion 23 of conduit 16; and a wire mesh ring 24 is preferably interposed between portions 22 and 23 of conduit 16.

As noted above, heat exchanger 10 is always much colder than the rest of muffler 1, by being cooled continually by the liquid flowing inside it. Accordingly, heat exchanger 10, and therefore conduit 16 integral with it, have a different thermal expansion from the rest of muffler 1. To prevent this from causing structural damage to muffler 1, heat exchanger 10 is mounted to slide longitudinally with respect to main body 4. More specifically, heat exchanger 10 is integral with conduit 16, which is mounted to slide longitudinally with respect to main body 4. In one embodiment, conduit 16 extends through and is integral with (welded to) at least one diaphragm 8, which extends crosswise inside main body 4 and simply rests on the inner surface of lateral wall 5 of main body 4, so as to slide freely with respect to main body 4. In an alternative embodiment, conduit 16 extends through at least one diaphragm 8 extending crosswise inside main body 4 and integral with (welded to) lateral wall 5 of main body 4, and conduit 16 simply rests on the edge of diaphragm 8 to slide freely with respect to diaphragm 8.

Obviously, mounting conduit 16, supporting heat exchanger 10, so as to slide longitudinally with respect to main body 4, is an alternative to compensating portion 21 of conduit 16 described above.

In one embodiment, an annular (typically square) stop is welded to the inner surface of conduits 13 and 16 at regulating valve 17, to support the end of shutter 18 opposite the hinged end, and act as a limit stop to accurately define the two positions of shutter 18. The side of the stop facing shutter 18 is preferably covered with wire mesh, which deforms elastically when impacted by shutter 18 to cushion the impact of shutter 18 against the stop.

In one embodiment, the outer wall of heat exchanger 10 is heat insulated, either by material of low heat conductivity or a gap (i.e. an air gap) surrounding heat exchanger 10, to reduce heat transfer from conduit 16 to heat exchanger 10 when conduit 13 is closed by regulating valve 17. In one embodiment, the heat insulation may be defined by ceramic fibres filling one or more of chambers 9a, 9b, 9c, and which provides for both insulating heat exchanger 10 and deadening noise.

In all the embodiments shown in the drawings, the continuity of conduit 13 is interrupted inside an initial chamber 9a, so that the exhaust gas from inlet 2 flows into initial chamber 9a through a number of through holes 25, and expands inside initial chamber 9a and an intermediate chamber 9b adjacent to initial chamber 9a and separated from it by a diaphragm 8a with a number of through holes 26. The exhaust gas fed by conduit 13 into initial chamber 9a through holes 25 flows into intermediate chamber 9b through holes 26 in diaphragm 8a, then back into conduit 13, and along conduit 13 to outlet 3.

Figure 5:
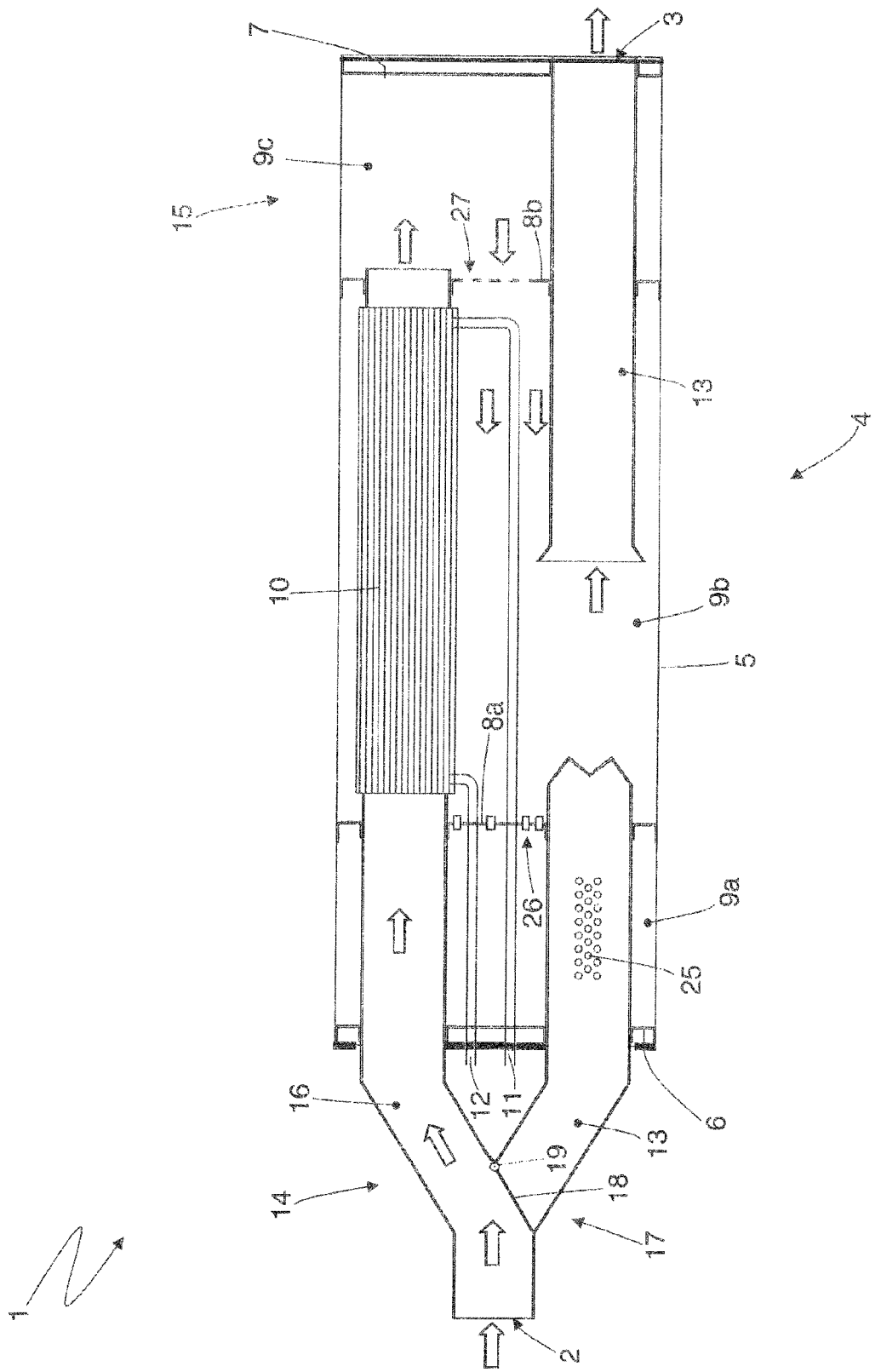
FIGS. 5 and 6 show schematic longitudinal sections of two variations of the muffler shown in FIG. 1.
Figure 6:
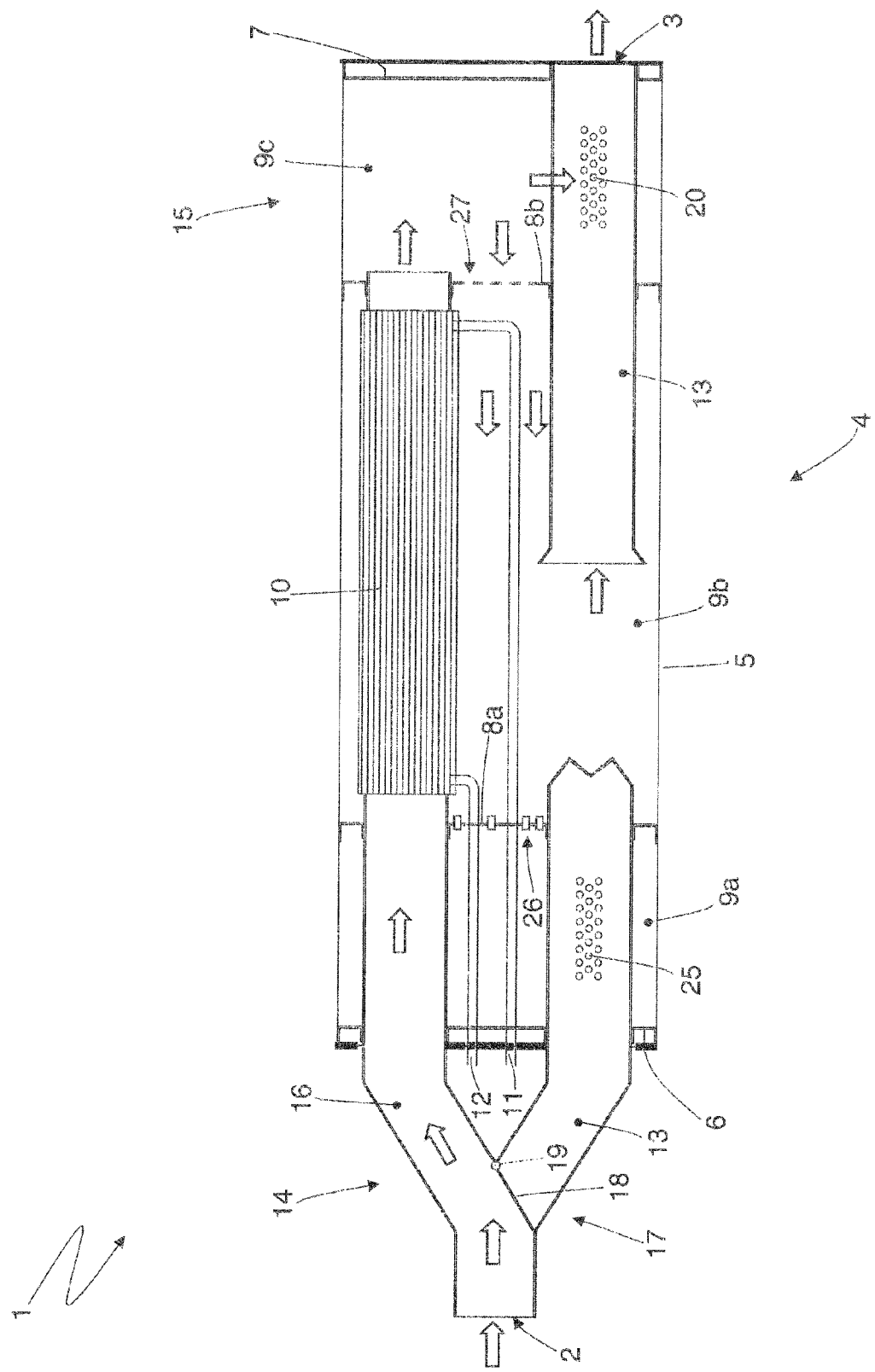

In the embodiment illustrated in FIGS. 1 and 2, conduit 13 extends through and has a number of through holes 20 inside end chamber 9c, so that the exhaust gas flowing into end chamber 9c from conduit 16 flows into the end portion of conduit 13 through holes 20 and then to outlet 3. In the embodiment illustrated in FIG. 5, conduit 13 has no through holes 20, and their function is performed by through holes 27 in the diaphragm 8b separating end chamber 9c from the adjacent intermediate chamber 9b. In this case, the exhaust gas flowing into end chamber 9c from conduit 16 flows into intermediate chamber 9b through holes 27 in diaphragm 8b and then into conduit 13. The FIG. 6 embodiment has both through holes 20 in conduit 13, and through holes 27 in diaphragm 8b, so the exhaust gas flowing into end chamber 9c from conduit 16 has two alternative routes by which to reach conduit 13.

In its operative mode, the actuating device rotates shutter 18 of regulating valve 17, about axis of rotation 19, between the first position (FIGS. 1 and 3) completely closing conduit 13 and only allowing exhaust gas flow along conduit 16, and the second position (FIGS. 2 and 4) completely closing conduit 16 and only allowing exhaust gas flow along conduit 13. The first position (FIGS. 1 and 3) serves to direct all the exhaust gas in muffler 1 through heat exchanger 10, and the second position (FIGS. 2 and 4) to prevent any of the exhaust gas in muffler 1 from flowing through heat exchanger 10.

The muffler 1 of the present invention has numerous advantages. First and foremost, it is inexpensive and easy to produce. Secondly, regulating valve 17 is highly compact, and the shaft supporting shutter 18 is extremely short, and so subject to little thermal expansion. In addition, muffler 1 is highly effective in terms of noise deadening performance, when compared with similar known mufflers with built in heat exchangers. This is particularly evident when regulating valve 17 is set (as it is most of the time) to the second position (FIGS. 2 and 4) closing conduit 16 and bypassing heat exchanger 10.

It is important to note that the embodiment illustrated in FIGS. 1 and 2, in which regulating valve 17 is located at fork region 14, provides for better isolating conduit 13 from the exhaust gas flow when regulating valve 17 is in the second position, but overall noise-deadening performance is poorer. On the other hand, the FIGS. 3 and 4 embodiment, in which regulating valve 17 is located at converging region 15, provides for less effectively isolating conduit 13 from the exhaust gas flow when regulating valve 17 is in the second position closing conduit 16, but has better overall noise-deadening performance, by virtue of conduit 16, closed at the leading end (as opposed to the trailing end), acting as a 'quarter-wave'.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A muffler comprising:
    only one inlet and only one outlet, through which exhaust gas flows;
    a tubular main body having a cylindrical lateral wall;
    a flat front wall, close to the inlet, and a flat rear wall, close to the outlet, which close both ends of the cylindrical lateral wall;
    a heat exchanger inside the main body;
    a noise-deadening first conduit, which extends at least partly inside the main body, from a fork region located outside the main body and directly downstream from the inlet, to a converging region directly upstream from the outlet;
    a second conduit, which extends through the heat exchanger and at least partly inside the main body, from the fork region to the converging region and parallel to the first conduit; and
    a regulating valve located at the fork region, outside the main body, to selectively direct exhaust gas flow along the first conduit or the second conduit;
    wherein the converging region is located inside the main body and is defined by an end chamber that is formed in the main body, close to the rear wall, and is separated from the rest of the main body by a diaphragm;
    wherein the first conduit extends across the diaphragm and through the end chamber so that an outlet of the first conduit constitutes the outlet of the muffler;
    wherein an outlet of the second conduit comes out across the diaphragm and inside the end chamber; and
    wherein the first conduit comprises an opening communication with the end chamber.

2. The muffler as set forth in claim 1, wherein the first conduit has at least one first trough-hole that is arranged inside the end chamber and defines the opening communicating with the end chamber.

3. The muffler as set forth in claim 1, wherein the first conduit has an inlet inside an intermediate chamber adjacent to the end chamber and separated from the end chamber by the diaphragm.

4. The muffler as set forth in claim 3, wherein the diaphragm has at least one second through-hole so that the inlet of the first conduit in the intermediate chamber defines also the opening communicating with the end chamber.

5. The muffler as set forth in claim 1, wherein the first and second conduit slope to form a 'V' shape at the fork region and the regulating valve comprises a flat shutter hinged at the vertex of the 'V' to rotate, about an axis of rotation, between a first position closing the first conduit, and a second position closing the second conduit.

6. The muffler as set forth in claim 1, wherein the heat exchanger is mounted to slide longitudinally with respect to the main body.

7. The muffler as set forth in claim 6, wherein the heat exchanger is integral with the second conduit, which is mounted to slide longitudinally with respect to the main body.

8. The muffler as set forth in claim 7, wherein the second conduit extends through and is integral with at least one diaphragm, which extends crosswise inside the main body and rests on the inner surface of the lateral wall of the main body, so as to slide freely with respect to the main body.

9. The muffler as set forth in claim 7, wherein the second conduit extends through at least one diaphragm extending crosswise inside the main body and integral with the lateral wall of the main body and the second conduit rests on the edge of the diaphragm, so as to slide freely with respect to the diaphragm.

10. The muffler as set forth in claim 1, wherein the heat exchanger is a liquid-gas type, and includes a liquid inflow conduit and a liquid outflow conduit, which exit longitudinally from the main body through the front wall or the rear wall.

11. A muffler comprising:
    an inlet and an outlet, through which exhaust gas flows;
    a tubular main body having a cylindrical lateral wall;
    a flat front wall, close to the inlet, and a flat rear wall, close to the outlet, which close both ends of the cylindrical lateral wall;
    a heat exchanger inside the main body;
    a noise-deadening first conduit, which extends at least partly inside the main body, from a fork region located directly downstream from the inlet, to a converging region located directly upstream from the outlet;
    a second conduit, which extends through the heat exchanger and at least partly inside the main body, from the fork region to the converging region and parallel to the first conduit; and
    a regulating valve located outside the main body, and for selectively directing exhaust gas flow along the first conduit or the second conduit; and
    wherein the heat exchanger is mounted to slide longitudinally with respect to the main body.

12. The muffler as set forth in claim 11, wherein the heat exchanger is integral with the second conduit, which is mounted to slide longitudinally with respect to the main body.

13. The muffler as set forth in claim 12, wherein the second conduit extends through and is integral with at least one diaphragm, which extends crosswise inside the main body and rests on the inner surface of the lateral wall of the main body, so as to slide freely with respect to the main body.

14. The muffler as set forth in claim 12, wherein the second conduit extends through at least one diaphragm extending crosswise inside the main body and integral with the lateral wall of the main body and the second conduit rests on the edge of the diaphragm, so as to slide freely with respect to the diaphragm.

15. A muffler comprising:

an inlet and an outlet, through which exhaust gas flows;

a tubular main body having a cylindrical lateral wall and a flat front wall, close to the inlet, and a flat rear wall, close to the outlet, which close both ends of the cylindrical lateral wall;

a heat exchanger inside the main body and a noise-deadening first conduit, which extends at least partly inside the main body, from a fork region located directly downstream from the inlet, to a converging region located outside the main body and directly upstream from the outlet;

a second conduit, which extends through the heat exchanger and at least partly inside the main body, from the fork region to the converging region and parallel to the first conduit; and a regulating valve located at the converging region, outside the main body, to selectively direct exhaust gas flow along the first conduit or the second conduit;

wherein the second conduit extends through the whole of the main body, through the front wall and the rear wall, and comprises a first portion extending from the fork region and a second portion extending to the converging region, the two portions being independent each from the other and connected one to the other at a compensating zone arranged inside the main body;

wherein, at the compensating zone, a smaller-diameter portion of the second conduit fits inside a larger-diameter portion of the second conduit, so as to slide longitudinally with respect to the larger-diameter portion; and wherein, at the compensating zone, the smaller-diameter portion of the second conduit fits with some clearance inside the larger-diameter portion of the second conduit, so as to define between the two portions an annular chamber that is completely filled by a wire mesh ring interposed between the two portions.

16. The muffler as set forth in claim 15, wherein the heat exchanger is integral with the second conduit, which is mounted to slide longitudinally with respect to the main body.

* * * * *